United States Patent [19]

Yoshida

[11] 3,865,384

[45] Feb. 11, 1975

[54] DISC RECORD PLAYER

[76] Inventor: Kohji Yoshida, Shimoarai 1141-29, Tokorozawa, Japan

[22] Filed: Mar. 25, 1974

[21] Appl. No.: 454,757

[30] Foreign Application Priority Data

Mar. 26, 1973 Japan ............................ 48-36521

[52] U.S. Cl. ............................................. 274/23 R
[51] Int. Cl. ............................................. G11b 3/10
[58] Field of Search ............... 274/10 R, 23 R, 23 A

[56] References Cited

UNITED STATES PATENTS

| | | | |
|---|---|---|---|
| 1,438,642 | 12/1922 | Graham | 274/23 R |
| 2,587,677 | 3/1952 | Ammlung | 274/23 R |
| 3,313,546 | 4/1967 | Yoshikawa | 274/23 R |
| 3,826,505 | 7/1974 | Birch | 274/23 A |

OTHER PUBLICATIONS

Audio Engineering, Vol. 36, Issue 3, pp. 17–19, March 1952.

*Primary Examiner*—Richard E. Aegerter
*Assistant Examiner*—Charles E. Phillips
*Attorney, Agent, or Firm*—Cushman, Darby & Cushman

[57] ABSTRACT

A disc record player comprising a hole position adjusting mechanism mounted on a tone arm mounting board, the hole position adjusting mechanism including a first disc which is associated with the tone arm mounting board and is rotatably supported thereby and a second disc which has a hole at its eccentric position for mounting the support shaft of the tone arm and is rotatably supported by the first disc at its eccentric position, whereby the position of the hole can be varied within a predetermined range by rotatably moving the first and the second discs separately or together.

7 Claims, 3 Drawing Figures

DISC RECORD PLAYER

BACKGROUND OF THE INVENTION

1. Field of the Invention

The present invention relates to a disc record player, and more particularly to a hole position adjusting mechanism in a player capable of adjusting the position of the hole for mounting the support shaft of the tone arm within a predetermined range.

2. Description of the Prior Art

As the mounting position of the tone arm for the disc record player is restricted inherently by the length or shape of the tone arm to be used for the stylus to trace the predetermined ideal path, the hole which is formed in the tone arm mounting board e.g., the motor board for mounting the support shaft of the tone arm so as to conform to the specified tone arm connot be used for other tone arms of different lengths and shapes. This may be one factor to obstruct the productivity for manufacturers who manufacture the players of different types utilizing a tone arm mounting board of a uniform type, and will inevitably inconvenience users of a player when they need to change the tone arm being used to another one as it requires to make another hole to comform to the new tone arm. However, no such disc record players capable of adjusting the position of such a hole have heretofore existed.

SUMMARY OF THE INVENTION

The principal object of the present invention is, therefore, to provide a disc record player capable of adjusting the position of the hole for mounting the support shaft of the tone arm easily and freely within a predetermined range.

Another object of the present invention is to provide a disc record player including a hole position adjusting mechanism for adjusting the position of the hole for mounting the support shaft of the tone arm, which requires fewer parts and can be constructed at a low cost.

Still another object of the present invention is to provide a disc record player including the hole position adjusting mechanism which is simple in construction and is adaptable to all varieties of the tone arm mounting board regardless of the material to be used.

According to the present invention, the foregoing and other objects are attained by providing a hole position adjusting mechanism including the first disc which is rotatably supported by the tone arm mounting board and the second disc which has a hole for mounting the shaft of the tone arm at an eccentric position and is rotatably supported by the first disc at an eccentric position.

BRIEF DESCRIPTION OF THE DRAWINGS

Other objects and features of the invention will become apparent to those skilled in the art as the disclosure made in the following detailed description when considered in connection with the accompanying drawings, in which like reference characters designate the same or similar parts throughout the figures thereof and wherein.

DESCRIPTION OF THE PREFERRED EMBODIMENTS

Figure 1:
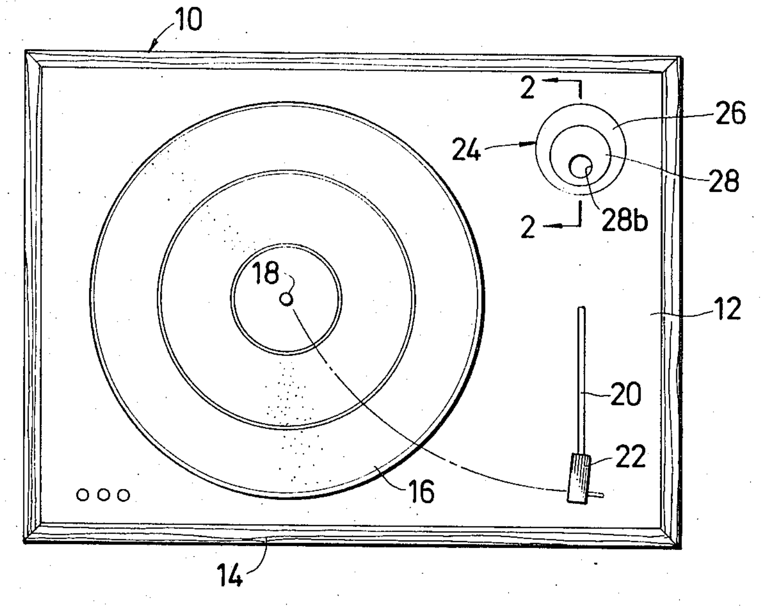
FIG. 1 is a plan view of the disc record player according to the present invention with the gimbal mechanism of the tone arm removed.
Figure 2:
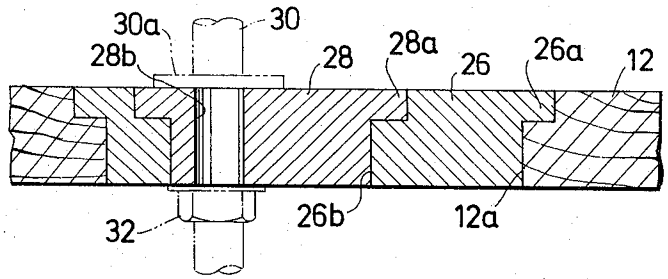
FIG. 2 is a fragmentary, sectional view taken along the line 2 — 2 of FIG. 1.

Referring now to FIGS. 1 and 2, there is shown a disc record player 10 which comprises motor board 12 secured to a rectangular casing 14. Supported rotatably on the motor board 12 is a turn table 16 which may be driven clockwise together with a center shaft 18 by a motor suitably supported at the back side of the board 12. A tone arm 20 having a transducer or pick-up cartridge 22 is also supported on the motor board 12. However, a pivot assembly including a gimbal mechanism of the arm 20 and a support shaft which may pivotably support the arm 20 is removed from FIG. 1 for the purpose of convenience and clarity of the explanation. At one corner portion of the motor board 12 where the support shaft of the arm 20 is mounted, a circular stepped opening **12*a* is formed to receive a hole position adjusting mechanism 24 for adjusting the positions of a hole 28*b*, to be described in detail hereinafter, to which the support shaft of the arm 20** may be inserted.

As shown in more detail in FIG. 2, the hole position adjusting mechanism 24 comprises the first disc 26 having a flange portion **26*a* adapted to be engageable with a step portion of the stepped opening 12*a* of the board 12 and a circular stepped opening 26*b* and the second disc 28 having a flange portion 28*a* engageable with a step portion of the stepped opening 26*b* of the first disc 26 and the hole 28*b* provided at an eccentric position of the disc 28. The first disc 26 enters into the stepped opening 12*a* of the board 12 with its flange portion 26*a* and periphery engaged frictionally with the step portion and inner surface of the stepped opening 12*a*, so that the disc 26 may be rotatably supported by the motor board 12 with a suitable amount of friction therebetween. Similarly, the second disc 28 enters into the stepped opening 26*b* of the first disc 26 with its flange portion 28*a* and periphery engaged frictionally with the step portion and inner surface of the stepped opening 26*b*, so that the disc 28 may rotatably be supported by the first disc 26 with a suitable amount of friction therebetween. The support shaft 30 which has a flange 30*a* and rotatably supports the tone arm 20 is shown in phantom in FIG. 2. The support shaft 30 is, after it was inserted into the hole 28*b*, secured to the second disc 28 by such means as a nut 32** which is also shown in phantom in FIG. 2.

In such an arrangement as described above, when the first disc 26 is rotatably moved with respect to the motor board 12, the relative position of the hole **28*b* with respect to the center shaft 18 of the turn table may be changed since the second disc 28 which has the hole 28*b* at an eccentric position thereof is moved together with the first disc 26 owing to the friction between the discs 26 and 28. In the same way, it is apparent that the relative position of the hole 28*b* may also be varied by moving rotatably the second disc 28 independently of the first disc 26. The rotatory movement of each of the first and the second discs 26 and 28 will cause relatively large and small displacements of the positions of the hole 28 with respect to the center shaft 18, respectively, so that it is desirable to use the first disc 26 for rough adjustments of the position of the hole 28*b* and the second disc 28** for fine adjustments of the same.

Accordingly, by rotatably moving the first and the second discs 26 and 28 suitably, the position of the hole 28*b* with respect to the center shaft 18 may be varied within a circle having a radius of a distance between the center of the first disc 26 and the point where the hole 28*b* is most displaced from the center. Hence, the position of the mount hole 28*b* for the support shaft 30 of the tone arm 20 to be mounted on the motor board 12 is easily and precisely determined so that the stylus of the pick-up cartridge 22 will trace a desired ideal path.

Figure 3:
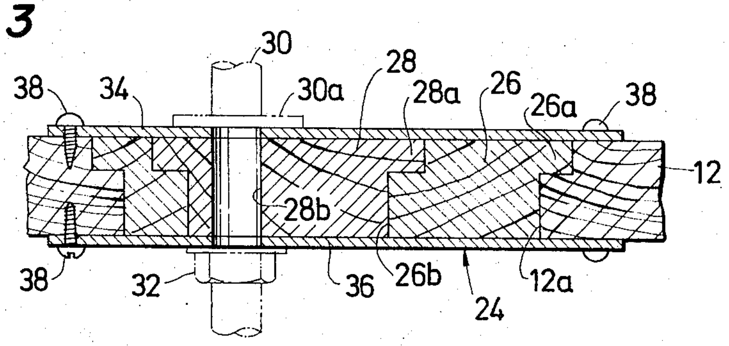
FIG. 3 is a similar view to FIG. 2 showing another embodiment according to the invention.

Though the hole position adjusting mechanism 24 is not secured to the motor board 12 in the embodiment shown in FIGS. 1 and 2, this arrangement is practical if the first and the second discs 26 and 28 are constituted from such a heavy material as a marble, lead or alminum board. However, as shown in FIG. 3, it is desirable for the hole position adjusting mechanism 24, if it is made from materials of relatively light in weight such as wood, to be secured to the motor board 12 by means of a pair of stout plates 34 and 36 and set screws 38 for instance, after the hole position adjustment was completed.

What I claim is:

1. A disc record player having a support shaft supporting a tone arm, comprising a tone arm mounting board and a hole position adjusting mechanism mounted on said tone arm mounting board; said hole position adjusting mechanism including a first disc rotatably and frictionally supported by said mounting board, said first disc having an eccentric hole in which a second disc is mounted, said second disc being provided with an eccentric hole for mounting the support shaft of the tone arm and said second disc being rotatably and frictionally supported by said first disc.

2. A disc record player according to claim 1, further comprising a fastening means for securing said hole position adjusting means to said tone arm mounting board.

3. A disc record player according to claim 1, in which said tone arm mounting board is a motor board.

4. A disc record player having a support shaft supporting a tone arm, comprising a tone arm mounting board provided with a first circular stepped opening, and a hole position adjusting mechanism received by said first stepped opening; said hole position adjusting mechanism including a first disc provided with a second circular stepped opening at an eccentric position and with a flange portion engageable with a step portion of said first stepped opening, said first disc being frictionally and rotatably supported by said mounting board, and a second disc provided with a hole at an eccentric position for mounting the support shaft of the tone arm and with a frange portion engageable with a step portion of said second stepped opening and frictionally and rotatably supported by said first disc.

5. A disc record player according to claim 4, further comprising a fastening means for securing said hole position adjusting means to said tone arm mounting board.

6. A disc record player according to claim 5, in which said fastening means is constituted from a pair of plates adapted to sandwich said mounting board and hole position adjusting mechanism, and a plurality of set screws for fixing said plates to said mounting board.

7. A disc record player according to claim 4, in which said tone arm mounting board is a motor board.

* * * * *